No. 759,735. PATENTED MAY 10, 1904.
F. MULLIGAN.
COMPUTING SCALE.
APPLICATION FILED MAR. 14, 1902.
NO MODEL. 2 SHEETS—SHEET 1.
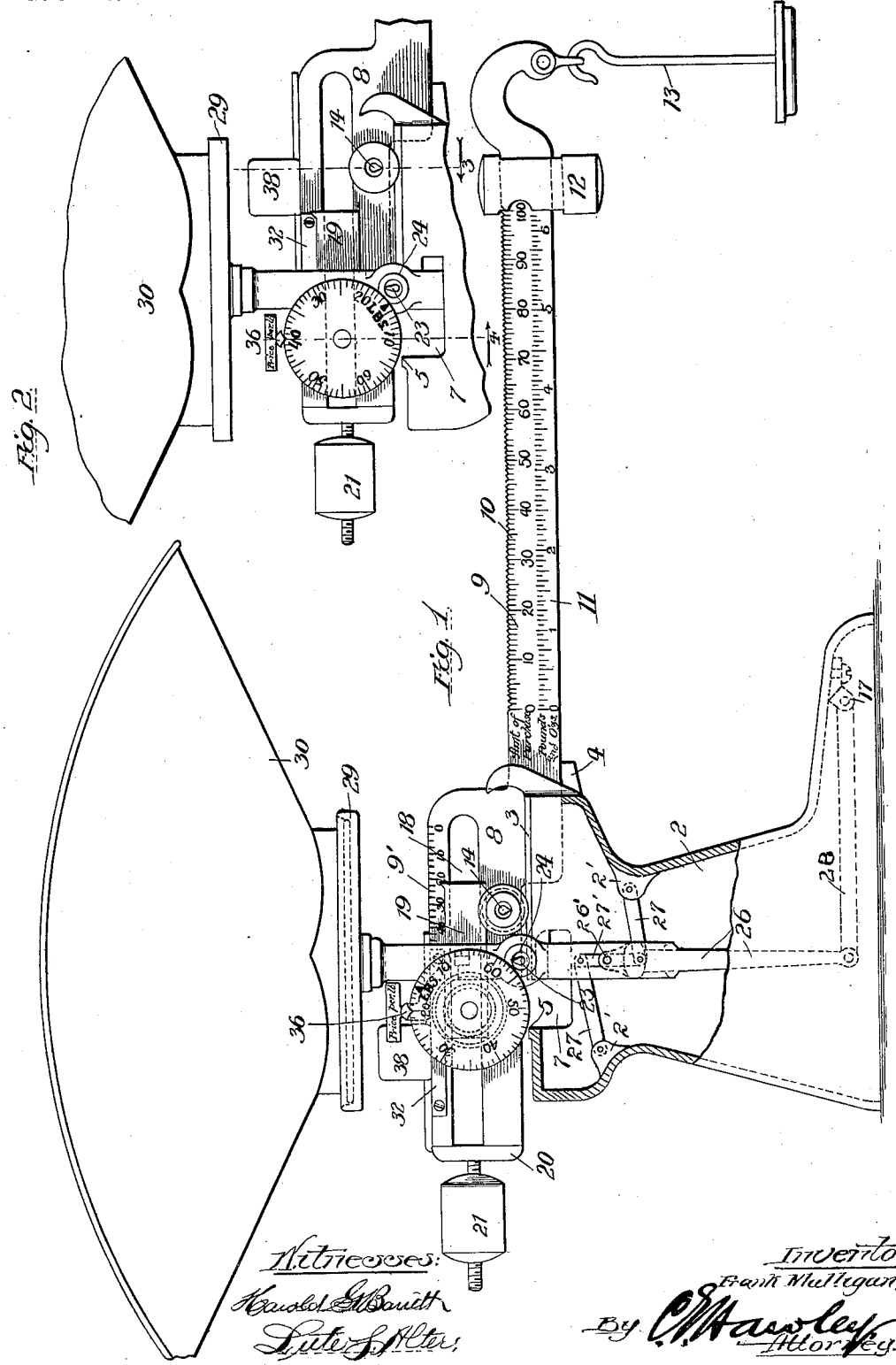

No. 759,735. PATENTED MAY 10, 1904.
F. MULLIGAN.
COMPUTING SCALE.
APPLICATION FILED MAR. 14, 1902.
NO MODEL. 2 SHEETS—SHEET 2.
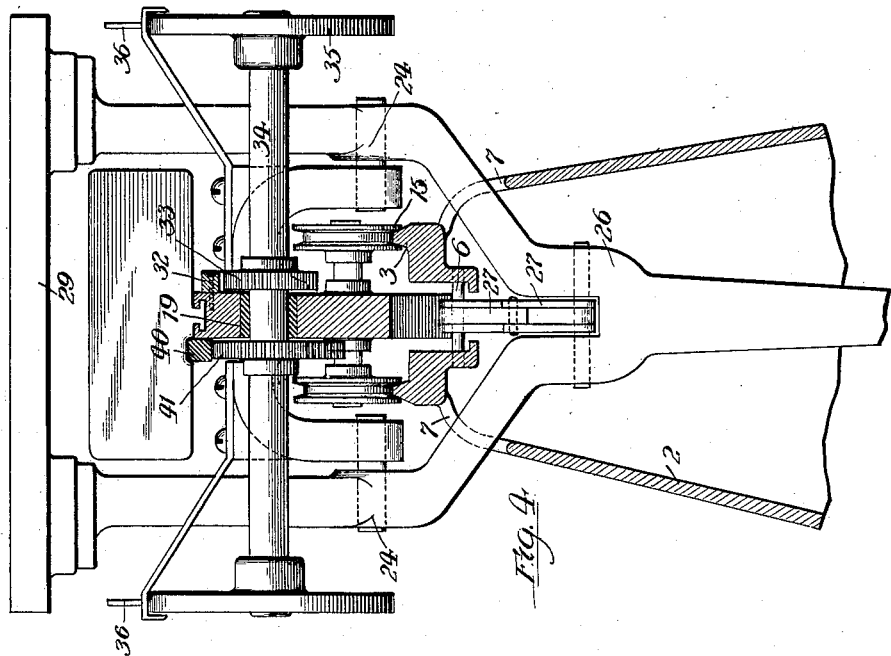
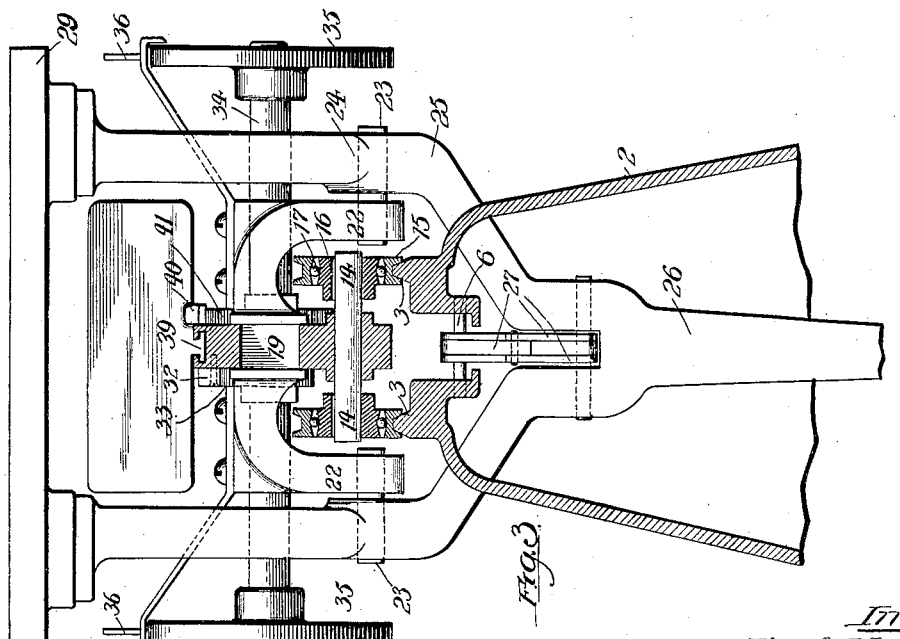

No. 759,735. Patented May 10, 1904.

UNITED STATES PATENT OFFICE.

FRANK MULLIGAN, OF CHICAGO, ILLINOIS, ASSIGNOR TO WILLIAM NELSON PELOUZE, OF CHICAGO, ILLINOIS.

COMPUTING-SCALE.

SPECIFICATION forming part of Letters Patent No. 759,735, dated May 10, 1904.

Application filed March 14, 1902. Serial No. 98,155. (No model.)

*To all whom it may concern:*

Be it known that I, FRANK MULLIGAN, a citizen of the United States, residing at Chicago, in the county of Cook and State of Illinois, have invented certain new and useful Improvements in Computing-Scales, of which the following is a specification.

This invention relates to computing-scales by means of which the value of different weights or quantities of various articles may be ascertained without mental calculation. Devices of this kind that are now in use are complicated in construction, are expensive to manufacture, and liable to frequent disorder. Another objection to the computing-scales now on the market is that each has a plurality of weights, poises, and beams having various functions, all of which the operator must know in order to use the scale properly. This plurality of parts and functions adds to the confusion and doubt that is already in the mind of the merchant and customer, because of the unfamiliar forms and the methods of working such computing-scales. The common beam or balance weighing-scale is well known to all. Belief in its accuracy is well established; and the object of this invention is to provide a computing-scale that shall closely resemble the ordinary scale both in appearance and the manner of its operation.

Another object of my invention is to dispense with a large number of beams and movable parts of computing-scales as commonly made and provide a computing-scale having the old form of beam-poise and, aside therefrom, having only one part that requires attention or manipulation by the operator, the scale being otherwise automatic, to the end that any intelligent person may use the scale without special instruction and may as readily explain its operation to a customer or purchaser.

The particular object of my invention is to provide a beam-scale wherein the beam and load-post are movable as to their supports or fulcrums and in which the mechanism that is employed to shift the beam shall automatically counterpoise the beam in every position.

A further particular object of my invention is to provide a computing-scale having a dial which the operator may turn to set the scale for weighing of materials of different values per pound and which dial shall be the means of automatically adjusting and counterpoising the beam.

My invention consists generally in a computing-scale comprising a graduated scale-beam and a load carrying or supporting part, said part and beam being slidably connected and so fulcrumed as to permit the relative movement thereof, in combination with beam-poises and means for simultaneously and relatively moving one of said poises and said beam and load part; and the invention further consists in various constructions and in combination of parts, all as hereinafter described, and particularly pointed out in the claims.

Figure 1 is a side view of a computing-scale embodying my invention. Fig. 2 is a detail taken from Fig. 1 and showing the beam farther projected. Fig. 3 is an enlarged cross-section on the line 3 3 of Fig. 2 viewed in the direction of the arrow, and Fig. 4 is a similar view on the line 4 4 of Fig. 2 viewed in the direction of the arrow.

I have illustrated my invention as embodied in a counter or scoop scale; but, as will hereinafter appear, the invention is independent of the particular construction of the scale-base and the means for loading the scale-beam, and my invention may be employed in a hanging scale or a platform-scale.

As illustrated in the drawings, the scale comprises a base and a scale-beam that is slidable on the base and which supports the load-post or draft-rod, as the case may be, whereon or whereto the load is applied. Associated with the beam and the load-post is a slide connection and a beam-moving contrivance, which in addition to moving the beam serves to indicate the price per pound of the material to be weighed and also operates to automatically counterpoise the scale-beam.

The invention will be better understood by considering the parts of the scale in detail with direct reference to the drawings.

*The frame or base.*—The base 2 of my scale conforms to the lines of the ordinary weighing-scale. It is hollow to contain the depending end of the load-post and the pivotal connections therefor. On top of the base 2 are the rails 3 3, and 4 and 5 are beam-stops that are provided on the base and which limit the swinging movement of the beam. Within the base are pivot-lugs 6 and 7, and at its top the base is provided with top and side openings 7 to receive the load-post of the scale.

*The beam.*—My computing-scale, unlike most of those in common use, has but one scale or graduated beam 8 and in this particular closely resembles the ordinary balance-scale beam. The long arm 9 of the scale-beam has one hundred graduations or marks 10, each representing one cent and all together representing one dollar. Below the money-graduations 10 are the weight-graduations 11, representing pounds and ounces, each pound-division being coextensive with sixteen of the cent-graduations 10.

12 is the sliding-beam poise, and 13 the added-weight-value hanger.

14 14 are the knife-edge trunnions of the scale-beam. These trunnions rest in the anti-friction-wheels 15. These wheels are flanged or grooved and rest upon the rails 3 3 of the base, whereby the scale-beam is made slidable upon the base. In order to avoid detrimental friction and wear, each wheel is provided with a hub 16 to contain the knife-edge 14, and this hub is mounted upon ball-bearings 17 within the wheel 15, the wheel and hub being of suitable construction (not shown) to permit the placing and adjustment of the balls. The ball-bearing hubs 16, which are the bearings proper for the beam, do not rotate. The wheels 15 rotate freely about the same and roll upon the track or rails. The bearing edges of the knife-bearings 14 are preferably in the same horizontal plane with the upper edge of the long arm 9 of the scale-beam. The short arm 9' of the scale-beam is provided with a slot 18, the greater part of which is back of the fulcrum or knife-edges 14. This slot contains the slide-block 19, which fits the same nicely, the beam being freely slidable thereon. The rear end of the slot 18 is closed by the block 20, which carries the balancing-poise 21 and which is placed in position after the block 19 is introduced into the slot. The block 19 is provided with depending arms or lugs 22 on opposite sides and from which extend the knife-edges or fulcrums 23 on which the load-post is hung. This, together with block 19, with its arms and knife-edges 23, constitutes the hanger or support whereby the weight is applied to the short arm of the scale-beam. The sharp edges of the parts 23 are uppermost, and these parts extend into the bearings 24, provided in the sides or arms 25 of the load-post.

*The load-post.*—The load-post comprises the arms 25 and the post proper, 26, within the base. The openings 7 in the base permit the necessary vertical movement of the load-post. The load-post is held in a vertical position and is limited to vertical movement by any suitable means, such as the link 28, which connects its lower end to the lug 17 on the base and the three links 27 27 27', the first two of which are pivoted on the lugs 2' of the base, while the middle vertical link 27' is attached to the post by a pivot 26'. The arms 25 of the load-post extend above the scale-beam and support the scoop-plate 29, upon which the scoop 30 is placed.

*The beam-sliding device.*—In an ordinary scale the ratio of leverage between the long and short arms of the beam is fixed; but in a computing-scale the effective length of the short arm is made variable, being determined according to the value per pound of the material of which it is desired to ascertain the value. If desired, the short arm of the scale may be graduated, as indicated in Fig. 1, a pointer being provided upon the block 19. In this case the beam would be adjusted by hand and the structure would be very simple; but the graduations would be fine, and it would be difficult to adjust the scale by direct hand movement. I therefore employ a rack-and-pinion connection between the block 19 (which latter is stationary with the post 26) and the slidable beam.

32 represents the rack, which is arranged upon the side of the short arm of the beam. 33 is a gear-pinion meshing with rack 32 and fixed upon the shaft 34, which has a transverse bearing in the block 19. On each end of the shaft 34 is an indicator-disk 35, having a graduated face, as illustrated in Fig. 1. A stationary pointer 36 is provided for each. These pointers are secured on the tops of the hanger-arms 22. (See Figs. 3 and 4.) The graduations on the indicator-disk 35 run from "0" to the highest decimal amount obtainable within the range of movement of the beam with respect to the block 19. The block being stationary, except for a very slight vertical movement or swing of the beam, it is obvious that when either indicator is turned the beam will be moved longitudinally upon the rails 3 to increase or diminish the distance between the fulcrums 14 and 23. To insure accuracy of balance, the knife-edges 14 and 23 are both made to include the horizontal plane of the upper edge of the arm 9 of the beam. When the beam is moved with relation to the load-post, it is obvious that the balance or equilibrium of the mechanism will be disturbed and that the beam must be accurately counterpoised in every position. To this end I arrange an automatic counterpoise in conjunction with the beam-sliding device.

*The automatic counterpoise.*—The beam is originally counterpoised by means of the part 21 when the beam-fulcrum 14 is at the greatest distance from the knife-edge or load-center 23. When this has been done, the indicator-dial is turned backwardly to run the beam back until the beam and load fulcrums or centers are close together, though not concentric. I then place upon the rear end of the beam a counter weight or poise 38 The beam previously will have settled upon the stop 4, and the placing of the weight 38 upon the short arm will now restore the beam to a balance. The position of the center of gravity of the weight 38 being now located upon the short arm, distance between the same and a vertical plane, including the fulcrum 14, is then determined, and the rack and pinion is provided to move the counterpoise through the exact determined distance at the same time that the beam is moved to its outermost position. The counterpoise 38 thus moves through the determined distance in the same direction as the beam and toward the long arm of the beam to accurately counterpoise the scale in every position of the beam. In detail the automatic counterpoise comprises the weight 38 and a T-slide 39 thereon, mounted in the top of the scale-beam. The part 38 carries the rack 40 longer than the rack 32 and meshing with pinion 41, that is larger than the pinion 33, whereby during the movement of the beam by the pinion 33 the poise 38 is moved in the same direction, but through a greater distance. It will be obvious upon reference to Fig. 2 that when the beam reaches its outermost position the counterpoise 38 will have arrived exactly over the scale-beam fulcrum 14, so that the beam will then be unaffected by it.

*Operation.*—Assuming that it is desired to determine the value of a given quantity of material worth twenty cents per pound, the operator turns the dial so that the dial-mark "20" will be directly beneath the pointer 36. In doing so he will move the beam in one direction or the other, according to the direction in which he moved the dial to reach the "20" mark. The dial having been adjusted, the operator pays no further attention thereto, but proceeds to balance the scale by means of the sliding poise 12, which will show the total value of the material in the scoop without reference to its weight. If the material is of such weight that the poise is lifted at its outer position, the operator will place a second dollar-weight upon the hanger 13 and proceed as with the ordinary scale, the result being one dollar and the number of cents indicated by the poise of the scale. If the material weighed was worth sixty cents per pound, the dial would be turned to bring "60" beneath the pointer, and so on. The simple turning of the dial, which is in plain sight to the operator and the customer upon either side of the machine, is all that is required to set the scale for any-priced material and accurately counterpoise the scale for the instant use of the beam-poise 12. In case it is necessary to determine the weight of the material in pounds and ounces the operator will turn the dial to the mark "Lbs.," which corresponds to the sixteenth graduation, or, in other words, to sixteen cents, it being obvious that the penny graduations upon the dial and the ounce graduations 11 upon the beam are thus made to accord. The dial being thus adjusted, the weight in pounds is determined by means of the poise 12 and the graduations 11 upon the scale-arm, which indicates pounds and ounces.

It is obvious that numerous modifications of my invention will suggest themselves to one skilled in the art, and I therefore do not confine my invention to the specific constructions herein shown and described.

Having described my invention, what I claim as new, and desire to secure by Letters Patent, is—

1. The combination of a relatively movable scale-beam and load-post, separately supported with a sliding connection between them, a poise and a counterpoise on said beam, a device for relatively moving said beam and post and means actuated by said device, automatically operating said counterpoise, substantially as described.

2. In a computing-scale, the base or support, in combination with the beam having a fulcrum movable along said base, the load-post suitably held the slidable block whereby it is sustained upon said beam, said block and beam being relatively movable, the rack-and-pinion connection between said block and beam, and a counterpoise movable upon and with said beam, substantially as described.

3. In a computing-scale, the base or support in combination with a beam fulcrumed on said base and movable longitudinally with respect thereto, a load-post constantly sustained upon said beam and with relation to which said beam and its fulcrums are movable, means provided in connection with said load-post for moving and indicating the distance of movement of said beam, and a beam-counterpoise carried by and movable on said beam, substantially as described.

4. In a computing-scale, the base or support having rails or guides, in combination with a beam having fulcrums, rollers constituting the bearings for said fulcrums and supported and movable upon said rails, a load-post sustained upon said beam, and means provided in connection with said post for relatively moving the beam and post and indicating the distance of movement of said beam and simultaneously counterpoising the beam, substantially as described.

5. In a computing-scale, the base or support having rails or guides, in combination with the beam having fulcrums antifriction-rollers upon said rails and supporting said beam, the load-post suitably held and pivotally sustained upon said beam and slidably connected therewith, an indicator connected with said beam, for moving the same, and a suitable counterpoise movable on said beam, substantially as described.

6. In a computing-scale, the base or support in combination with the beam having fulcrums movable with the beam upon said base or support, a slide-block with relation to which said beam is movable, a load-post pivotally attached to said block and thereby constantly sustained upon said beam, a rack-and-pinion connection between said block and said beam whereby the said beam is adjustable and a suitable counterpoise movable on said beam, substantially as described.

7. In a computing-scale, the base or support in combination with the beam having a fulcrum movable longitudinally with relation to and upon said base or support, a slide-block carried by said beam and with relation to which the beam is movable, a load-post pivotally sustained upon said block, a rack-and-pinion connection between said block and said beam whereby the beam is adjustable, an indicator-dial associated with said rack and pinion and a suitable counterpoise movable on said beam, substantially as described.

8. In a computing-scale, the base or support, in combination with the beam, suitably fulcrumed and movable upon said base or support, a slide-block with relation to which said beam is slidable, a load-post pivotally sustained upon said block, a rack-and-pinion connection between said block and said beam, an indicator-dial associated with said rack and pinion, and a counterpoise suitably mounted upon said beam and movable means connecting the same with said indicator for movement thereby, substantially as described.

9. In a computing-scale, the base or support in combination with the scale-beam suitably fulcrumed and longitudinally movable upon said support, the load-post whereto said beam is slidably connected, a shaft movable with said post, a rack-and-pinion connection between said shaft and said beam, a counterpoise upon said beam and a suitable connection between said shaft and said counterpoise for moving the latter, substantially as described.

10. In a computing-scale, the base or support in combination with the beam having fulcra and movable carriers therefor, said beam and its fulcra being movable upon and longitudinally of said support, a vertically-movable load-post, means connecting said beam and post, means for moving said beam longitudinally, a counterpoise movable upon said beam and automatically actuated by the means for moving the beam and in the same direction, substantially as described.

11. In a computing-scale, the base or support in combination with the longitudinally-movable suitably-fulcrumed beam, the load-post, a slidable connection between said post and beam, a shaft carried thereby, an indicator arranged upon said shaft, a counterpoise movable upon the short arm of said beam, and means whereby said shaft when rotated causes the movement of the beam and a greater movement of the counterpoise, substantially as described.

12. In a single-beam computing-scale, the support in combination with the beam suitably fulcrumed and longitudinally movable upon said support, a load-post, a rack-and-pinion connection between said post and beam, a manually-operated indicator associated therewith for moving the beam, and a suitable counterpoise movable on said beam, substantially as described.

13. In a computing-scale, the beam suitably fulcrumed, a load-post, a movable connection between said post and beam, a manually-operated indicator for operating said connection and a counterpoise upon the short arm of said beam and movable with respect to and in the same direction as the beam, by said indicator, substantially as described.

14. In a computing-scale, the base or support in combination with the scale-beam suitably fulcrumed and movable upon said support, the load-post, the block 19 slidably connecting said post and beam, the shaft in said block, indicating means for turning said shaft, a suitable connection between said shaft and beam, the counterpoise 38 slidable upon said beam and a suitable connection between said poise and shaft for moving the same, substantially as described.

15. In a computing-scale, the base or support in combination with the movable scale-beam suitably fulcrumed on said support, the load-post, the block slidably connecting the post and beam, the transverse shaft in said block, the rack-and-pinion connection between said shaft and said beam, the counterpoise 38 slidable upon said beam and having a rack, and, a pinion upon said shaft meshing with said rack, substantially as described.

16. In a computing-scale, the base or support having the rails 3, 3, in combination with the scale-beam having the fulcrums 14, the antifriction-rollers containing said fulcrums and resting upon said rails and a suitable load connection and beam-moving device, substantially as described.

17. In a computing-scale, the combination with the base having the rails, of the beam having the fulcrums 14, the rollers 15 and the ball-bearing hubs thereof containing said fulcrums 14, substantially as described.

18. In a computing-scale, the base provided with rails 3, 3, in combination with a scale-beam having a suitable poise and fulcrums 14, the rollers 15 having antifriction-hubs containing said knife-edges 14, the block 19 whereto said beam is slidably connected, the knife-edges 23 upon said block, the load-post pivotally sustained thereby, the shaft in said block, the indicator thereon, the rack upon said beam, the pinion on said shaft meshing with said rack, the counterpoise 38 slidable on said beam and having a rack 40, the larger pinion 41 upon said shaft, meshing with said rack 40, and the balancing-poise upon said beam, substantially as described.

19. In a single-beam computing-scale, the base, in combination, with the relatively movable scale-beam having money-graduations and a slidable poise, the load-post pivotally sustained upon said beam, a counterpoise movable upon said beam, an indicator having money-graduations and the indicator connections with said beam and said counterpoise for moving them in the same direction, substantially as described.

20. In a single-beam computing-scale, the base in combination with the single movable scale-beam having money-graduations and also having graduations for pounds and ounces, the sliding poise, the load-post pivotally sustained upon said beam, a counterpoise for said beam, an indicator having money-graduations and a set-mark, and, indicator connections with said beam and said counterpoise for moving the same unequal distances in the same direction, substantially as described.

21. In a computing-scale, the base or standard in combination with a single scale-beam having a poise and a counterpoise, the fulcrums of said beam, antifriction-supports for said fulcrums whereby the same are adapted for movement upon said support, a load-block slidably connected with the short arm of said beam, a vertically-movable load-post pivotally sustained upon said block, the long arm of said beam having money-graduations, a dial or indicator having money-graduations, and operating means joining said block and beam and connected with said indicator for operation thereby, substantially as described.

22. In a computing-scale, the base or support in combination with the single beam provided with money-graduations and having a sliding poise upon its long arm, said beam being suitably fulcrumed and longitudinally movable with relation to said support, a load-post slidably connected with the short arm of said beam, a counterpoise provided upon the short arm of said beam and means connecting said beam and post and also connected with said counterpoise for moving said beam and counterpoise unequally in the same direction, substantially as described.

23. In a computing-scale, the scale-beam suitably fulcrumed, in combination with a load-post connected with the short arm of said beam, means for moving the fulcrum of said beam toward and from said post, a counterpoise provided upon said beam and connected with said means, for relative movement thereby in the same direction as the beam, substantially as described.

In testimony whereof I have hereunto set my hand, in the presence of two witnesses, this 31st day of January, 1902.

FRANK MULLIGAN.

In presence of—
C. G. HAWLEY,
J. W. BECKSTROM.